United States Patent
Kim et al.

(10) Patent No.: US 10,560,196 B2
(45) Date of Patent: Feb. 11, 2020

(54) APPARATUS AND METHOD FOR ADJUSTING MODULATION INDEX OF ANALOG OPTICAL SIGNAL USING INTERFERENCE PHENOMENON OF COHERENT LIGHT

(71) Applicant: ELECTRONICS AND TELECOMMUNICATIONS RESEARCH INSTITUTE, Daejeon (KR)

(72) Inventors: Joonyoung Kim, Daejeon (KR); Minkyu Sung, Seoul (KR); Jong Hyun Lee, Daejeon (KR); Seung-Hyun Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/197,793

(22) Filed: Nov. 21, 2018

(65) Prior Publication Data

US 2019/0165866 A1 May 30, 2019

(30) Foreign Application Priority Data

Nov. 29, 2017 (KR) .......................... 10-2017-0161262

(51) Int. Cl.
*H04B 10/58* (2013.01)
*H04B 10/516* (2013.01)
(Continued)

(52) U.S. Cl.
CPC ....... *H04B 10/58* (2013.01); *H04B 10/25752* (2013.01); *H04B 10/5161* (2013.01); *H04B 10/60* (2013.01)

(58) Field of Classification Search
CPC .......................... H04B 10/5161; H04B 10/58
(Continued)

(56) References Cited

U.S. PATENT DOCUMENTS 5,774,217 A * 6/1998 Lee .................... G01N 21/45
356/517
5,973,820 A * 10/1999 Fuse .................... H03C 3/36
359/238

(Continued)

FOREIGN PATENT DOCUMENTS

KR 10-0875468 B1 12/2008
WO 2015/023028 A1 2/2015

OTHER PUBLICATIONS

Zhang et al ; Optical single side band polarization modulation for radio-over-fiber system and microwave photonic signal processing; Aug. 2014; pp. 80-85 (Year: 2014).*

*Primary Examiner* — Amritbir K Sandhu
(74) *Attorney, Agent, or Firm* — LRK Patent Law Firm (57) ABSTRACT

A method and apparatus for adjusting a modulation index of an analog optical signal using an interference phenomenon of a coherent light, the method including dividing an analog optical signal for a first path and a second path, extracting an optical carrier from an analog optical signal divided for the first path, controlling an intensity and a phase of the optical carrier, and controlling a modulation index of the analog optical signal by combining an analog optical signal divided for the second path and the optical carrier of which the intensity and the phase are controlled.

10 Claims, 5 Drawing Sheets

(51) Int. Cl.
*H04B 10/2575* (2013.01)
*H04B 10/60* (2013.01)

(58) Field of Classification Search
USPC .................................................. 398/182–198
See application file for complete search history.

(56) References Cited

U.S. PATENT DOCUMENTS

| | | | |
|---|---|---|---|
| 6,211,996 B1* | 4/2001 | Fuse | H03C 7/00 |
| | | | 359/238 |
| 7,474,858 B2 | 1/2009 | Lee et al. | |
| 8,165,474 B2 | 4/2012 | Zheng et al. | |
| 9,130,675 B2 | 9/2015 | Cho et al. | |
| 9,191,121 B2 | 11/2015 | Chung et al. | |
| 9,787,395 B2* | 10/2017 | Chung | H04B 10/07953 |
| 2005/0286908 A1* | 12/2005 | Way | H04B 10/2575 |
| | | | 398/186 |
| 2019/0165866 A1* | 5/2019 | Kim | H04B 10/25752 |

* cited by examiner

APPARATUS AND METHOD FOR ADJUSTING MODULATION INDEX OF ANALOG OPTICAL SIGNAL USING INTERFERENCE PHENOMENON OF COHERENT LIGHT

CROSS-REFERENCE TO RELATED APPLICATION(S)

This application claims the priority benefit of Korean Patent Application No. 10-2017-0161262 filed on Nov. 29, 2017, in the Korean Intellectual Property Office, the disclosure of which is incorporated herein by reference for all purposes.

BACKGROUND

1. Field of the Invention

One or more example embodiments relate to a method and apparatus for controlling a modulation index of an optical signal input to an optical receiver in a mobile fronthaul and indoor distributed antenna system (DAS) that transfers large-capacity mobile communication traffic using an analog optical signal.

2. Description of Related Art

A mobile fronthaul and indoor distributed antenna system (DAS) may be a system for transferring mobile communication traffic using an analog optical signal. Since an optical signal output from an optical transmitter of the mobile fronthaul and indoor DAS has a low modulation index of 10% or less, energy of at least 90% may be allocated to an optical carrier wave instead of a signal including information in the optical signal.

Also, an analog optical transmitter used for transmitting the analog optical signal in the mobile fronthaul and indoor DAS may include a low-cost analog laser diode capable of direct modulation. When a direct modulation laser is used for optical signal transmission, and when a bias current of a laser is below a predetermined range of a threshold current, nonlinear distortion and signal clipping may occur, which may reduce a modulation bandwidth. Thus, a laser diode may be operated using a bias current of the predetermined range or more at the threshold current.

However, when the laser diode is operated using the bias current of the predetermined range or more, an intensity of light output from the optical transmitter may be increased to saturate the optical receiver, so the intensity of the optical signal may need to be reduced to a range not including the optical receiver. In this example, when a total intensity of the optical signal is reduced, both an intensity of a direct current (DC) in an electrical domain and an intensity of an alternating current (AC) in the electrical domain may be reduced, so that a signal-to-noise ratio (SNR) is reduced.

Accordingly, there is desire for a method of reducing an intensity of an output optical signal by controlling a modulation index of an analog optical signal while maintaining an intensity of a signal included in the optical signal.

SUMMARY

An aspect a method and apparatus for controlling a modulation index of an analog optical signal by changing an intensity and a phase of an optical carrier wave extracted from the analog optical signal and combining the optical carrier wave having the changed intensity and phase with the analog optical signal.

According to an aspect, there is provided a method of controlling a modulation index of an analog optical signal, the method including dividing an analog optical signal for a first path and a second path, extracting an optical carrier from an analog optical signal divided for the first path, controlling an intensity and a phase of the optical carrier, and controlling a modulation index of the analog optical signal by combining an analog optical signal divided for the second path and the optical carrier of which the intensity and the phase are controlled.

The controlling of the intensity and the phase of the optical carrier may include controlling the intensity of the optical carrier based on a target value of the modulation index.

In a case in which the modulation index is to be increased, the controlling of the intensity and the phase of the optical carrier may include controlling the phase of the optical carrier such that a destructive interference occurs when the modulation index is controlled.

In a case in which the modulation index is to be decreased, the controlling of the intensity and the phase of the optical carrier may include controlling the phase of the optical carrier such that a constructive interference occurs when the modulation index is controlled.

The method may further include delaying the analog optical signal divided for the second path based on a time used for extracting the optical carrier and controlling the intensity and the phase of the extracted optical carrier, wherein the controlling of the modulation index may include combining the delayed analog optical signal divided for the second path and the optical carrier extracted from the analog optical signal divided for the first path and having the controlled intensity and phase.

According to another aspect, there is also provided an apparatus for controlling a modulation index of an analog optical signal, the apparatus including a divider configured to divide an analog optical signal for a first path and a second path, an optical carrier recovery configured to extract an optical carrier from an analog optical signal divided for the first path and control an intensity of the extracted optical carrier, a phase shifter configured to control a phase of the optical carrier of which the intensity is controlled, and a coupler configured to output the analog optical signal of which a modulation index is controlled, by combining an analog optical signal divided for the second path and the optical carrier of which the phase is controlled.

The optical carrier recovery may be configured to control the intensity of the optical carrier based on a target value of the modulation index.

In a case in which the modulation index is to be increased, the phase shifter may be configured to control the phase of the optical carrier such that a destructive interference occurs in the coupler.

In a case in which the modulation index is to be decreased, the phase shifter may be configured to control the phase of the optical carrier such that a constructive interference occurs in the coupler.

The apparatus may further include an optical delay line configured to delay the analog optical signal divided for the second path based on a time used for passing the analog optical signal divided for the first path through the optical carrier recovery and the phase shifter, wherein the coupler may be configured to combine the delayed analog optical signal divided for the second path and the optical carrier extracted from the analog optical signal divided for the first path and having the controlled phase.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
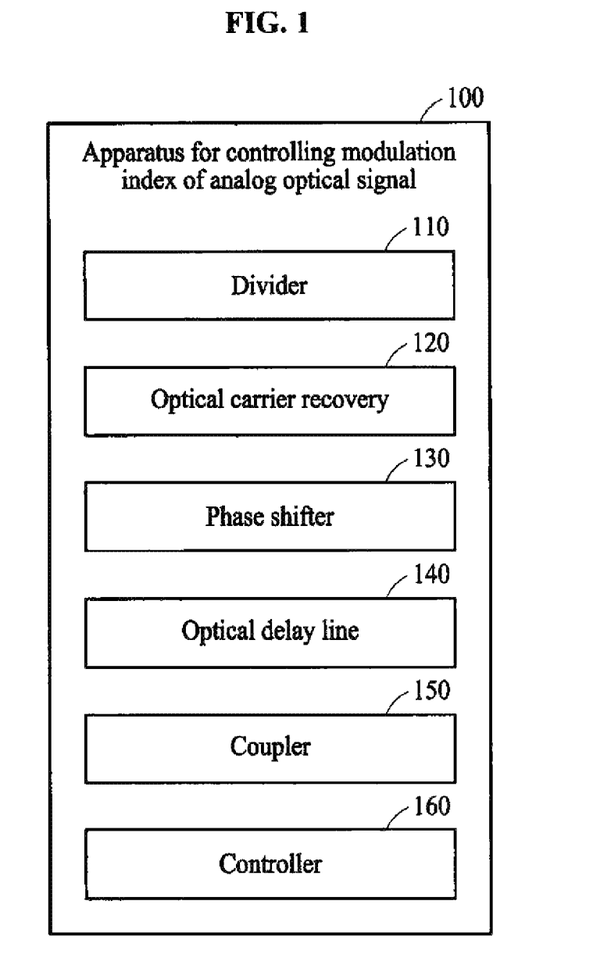
FIG. 1 is a diagram illustrating an apparatus for controlling a modulation index of an analog optical signal according to an example embodiment.

FIG. 1 is a diagram illustrating an apparatus for controlling a modulation index of an analog optical signal according to an example embodiment.

Referring to FIG. 1, an apparatus 100 for controlling a modulation index of an analog optical signal may include a divider 110, an optical carrier recovery 120, a phase shifter 130, an optical delay line 140, a coupler 130, and a controller 160.

The divider 110 may divide a received analog optical signal for a first path and a second path so as to be output.

The optical carrier recovery 120 may extract an optical carrier from an analog optical signal divided for the first path and control an intensity of the extracted optical carrier.

In this example, the optical carrier recovery 120 may control the intensity of the optical carrier based on a target value of the modulation index to be controlled by the apparatus 100.

The phase shifter 130 may control the phase of the optical carrier output from the optical carrier recovery 120.

When the modulation index is to be increased, the phase shifter 130 may control the phase of the optical carrier such that a destructive interference occurs in the coupler 150. Also, when the modulation index is to be reduced, the phase shifter 130 may control the phase of the optical carrier such that a constructive interference occurs in the coupler 150.

The optical delay line 140 may delay the analog optical signal divided for the second path based on a time used for extracting the optical carrier of the optical carrier recovery 120 and the phase shifter 130 and controlling the intensity and the phase of the extracted optical carrier.

Specifically, the analog optical signal divided for the first path may pass through the optical carrier recovery 120 and the phase shifter 130 to be incident on the coupler 150. A point in time at which the analog optical signal divided for the first path is incident on the coupler 150 may be delayed as compared to a point in time at which the analog optical signal divided for the second path is incident on the coupler 150 directly from the divider 110 through the second path. The optical delay line 140 may delay the analog optical signal divided for the second path based on a time delayed due to the analog optical signal divided for the first path passing through the optical carrier recovery 120 and the phase shifter 130, thereby synchronizing the analog optical signal divided for the second path with the analog optical signal divided for the first path incident on the coupler 150.

The coupler 150 may control a modulation index of an analog optical signal by combining the analog optical signal divided for the second path with the optical carrier having the phase controlled in the phase shifter 130. In this example, the analog optical signal that is extracted by the coupler 150 from the analog optical signal divided for the first path to be combined with the optical carrier having the controlled intensity and the phase may be the analog optical signal divided for the second path and delayed in the optical delay line 140.

When a destructive interference occurs between the optical carrier having the phase controlled by the phase shifter 130 and the analog optical signal divided for the second path and in the coupler 150, the intensity of the analog optical signal may be maintained and a magnitude of the optical carrier may be reduced, which may increase the modulation index. When a constructive interference occurs between the optical carrier having the phase controlled by the phase shifter 130 and the analog optical signal divided for the second path and in the coupler 150, the intensity of the analog optical signal may be maintained and a magnitude of the optical carrier may be increased, which may reduce the modulation index.

For example, the coupler 150 may be coupled with the divider. In this example, the coupler 150 may divide the analog optical signal of which the modulation index is controlled by combining the analog optical signal divided for the second path with the optical carrier having the phase controlled in the phase shifter 130, for an external output path and a path toward the controller 160.

The controller 160 may monitor the analog optical signal having the modulation is controlled in the coupler 150 and output from the coupler 150. In this example, the controller 160 may determine whether to additionally control the modulation index of the analog optical signal based on a monitoring result. When the modulation index of the analog optical signal is to be controlled, the controller 160 may control the optical carrier recovery 120 and the phase shifter 130.

For example, the controller 160 may determine a target value of a modulation index to be controlled, and transmit, to the optical carrier recovery 120, an intensity of an optical carrier to be changed based on the target value. In this example, the optical carrier recovery 120 may control the intensity of the optical carrier extracted from the analog optical signal divided for the first path based on the intensity of the optical carrier received from the controller 160.

Also, according to an increase in difference between the target value of the modulation index and the modulation index of the analog optical signal output from the coupler 150, the controller 160 may increase a range within which the intensity of the optical carrier is changed in the optical carrier recovery 120.

For example, the difference between the target value of the modulation index and the modulation index of the analog optical signal output from the coupler 150 may be "20". In this example, the controller 160 may determine to increase or reduce the intensity of the optical carrier by "20" in the optical carrier recovery 120. Likewise, when the difference between the target value of the modulation index and the modulation index of the analog optical signal output from the coupler 150 is increased to be "40," the controller 160 may determine to increase or reduce the intensity of the optical carrier by "40" in the optical carrier recovery 120.

Also, the controller 160 may determine whether to increase or reduce the modulation index. When the modulation index is to be increased, the controller 160 may request the phase shifter 130 such that a difference between the phase of the optical carrier output from the optical carrier recovery 120 and the phase of the optical carrier included in the analog optical signal divided for the second path is 180 degrees (°). Also, in response to the request from the controller 160, the phase shifter 130 may control the phase of the optical carrier output from the optical carrier recovery 120, so that the destructive interference occurs in the coupler 150.

When the modulation index is to be reduced, the controller 160 may request the phase shifter 130 such that a difference between the phase of the optical carrier output from the optical carrier recovery 120 and the phase of the optical carrier included in the analog optical signal divided for the second path is 0°. Also, in response to the request from the controller 160, the phase shifter 130 may control the phase of the optical carrier output from the optical carrier recovery 120, so that the constructive interference occurs in the coupler 150.

The apparatus 100 may extract an optical carrier from an analog optical signal, change an intensity and a phase of the optical carrier, and combine the optical carrier having the changed intensity and phase with an analog optical signal, thereby controlling a modulation index of the analog optical signal.

The apparatus 100 may perform an optimized optical communication in various environments using a single type of an optical transmitter and receiver by controlling a modulation index of an optical signal based on a difference in environment between optical transmitters and receivers such as a distance and an optical intensity loss, thereby reducing infrastructure construction and operation cost of a telecommunications carrier.

Figure 2:
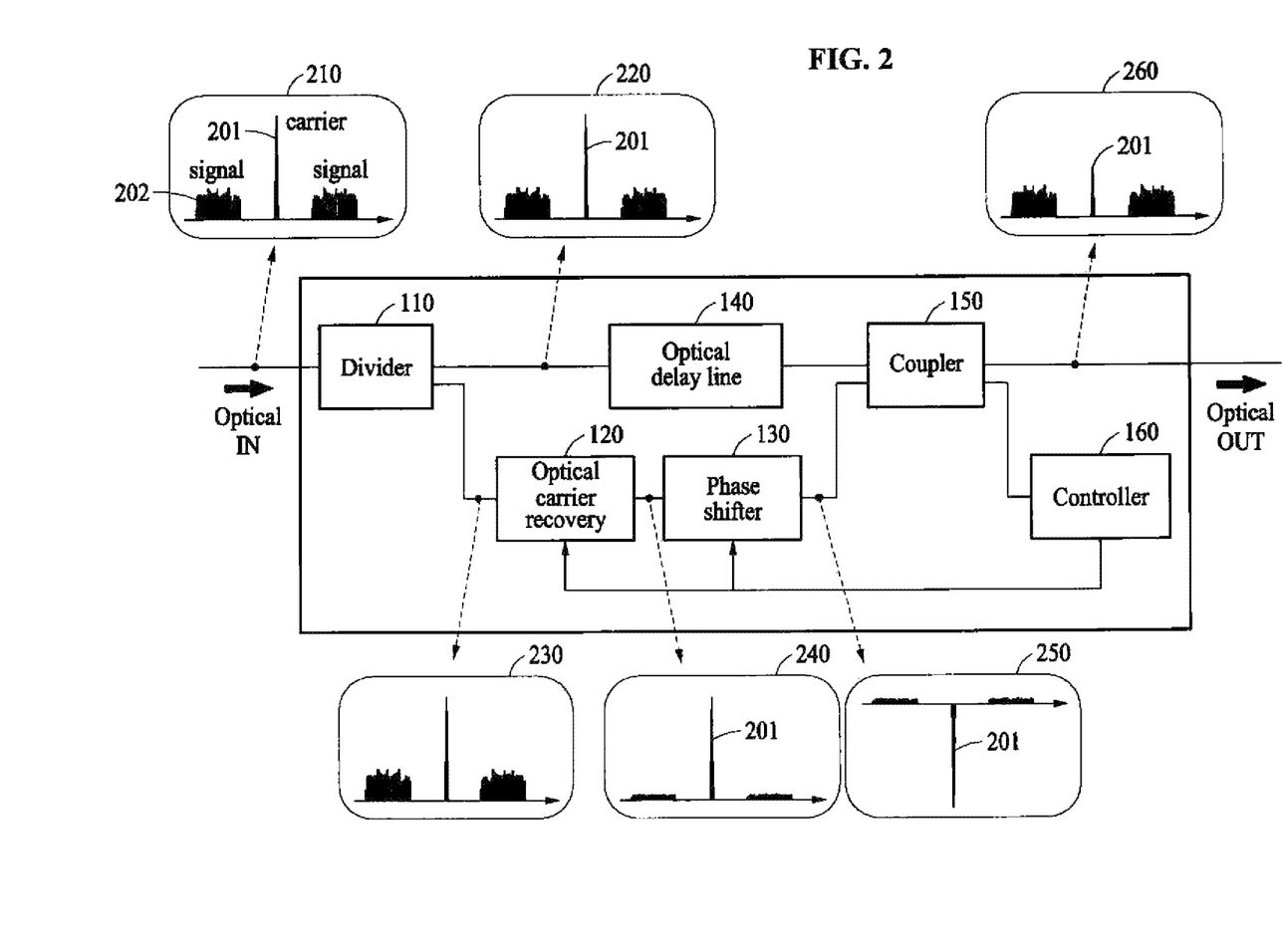
FIG. 2 is a diagram illustrating an operation of an apparatus for controlling a modulation index of an analog optical signal according to an example embodiment.

FIG. 2 is a diagram illustrating an operation of an apparatus for controlling a modulation index of an analog optical signal according to an example embodiment.

The divider 110 may receive an analog optical signal 210 including an optical carrier 201 and a signal 202 including information. The divider 110 may output the analog optical signal 210 through a division into a first path corresponding to a lower path and a second path corresponding to an upper path as shown in FIG. 2.

The optical carrier recovery 120 may extract the optical carrier 201 from an analog optical signal 230 divided for the first path and control an intensity of the extracted optical carrier. In this example, as illustrated in FIG. 2, an optical signal 240 output from the optical carrier recovery 120 may be an optical signal in which the signal 202 is removed and the optical carrier 201 remains.

The phase shifter 130 may control a phase of the optical carrier 201 included in the optical signal 240. For example, as illustrated in FIG. 2, an optical signal 250 output from the phase shifter 130 may be an optical signal of which a phase is opposite to that of the optical carrier 201 as compared with the optical signal 240.

The optical delay line 140 may delay an analog optical signal 220 divided for the second path.

The coupler 150 may combine the analog optical signal delayed in the optical delay line 140 with the optical signal 250 output from the phase shifter 130, thereby outputting an analog optical signal 260 in which the intensity of the optical carrier 201 is reduced. In this example, when compared to the intensity of the analog optical signal 210, the intensity of the analog optical signal 260 is the same and the intensity of the optical carrier 201 is reduced. Thus, the analog optical signal 260 may be an optical signal having an increased modulation index in comparison to the analog optical signal 210.

Also, the controller 160 may receive the analog optical signal 260 divided in the coupler 150. The controller 160 may monitor the analog optical signal 260. In this example, the controller 160 may determine whether to additionally control the modulation index of the analog optical signal 260 based on a monitoring result. Based on a determination result, the controller 160 may control the optical carrier recovery 120 and the phase shifter 130 to change the modulation index of the analog optical signal 260.

Referring to FIG. 2, the controller 160 may change the phase of the optical carrier 201 to be 180° in the phase shifter 130, so that a destructive interference occurs in the coupler 150. When the controller 160 does not change the phase of the optical carrier 201 in the phase shifter 130, a constructive interference may occur in the coupler 150 such that the intensity of the optical carrier 201 included in the analog optical signal 260 increases. In this example, when compared to the intensity of the analog optical signal 210, the intensity of the analog optical signal 260 may be the same and the intensity of the optical carrier 201 may be increased. Thus, the analog optical signal 260 may be an optical signal of which a modulation index is reduced from that of the analog optical signal 210.

Figure 3:
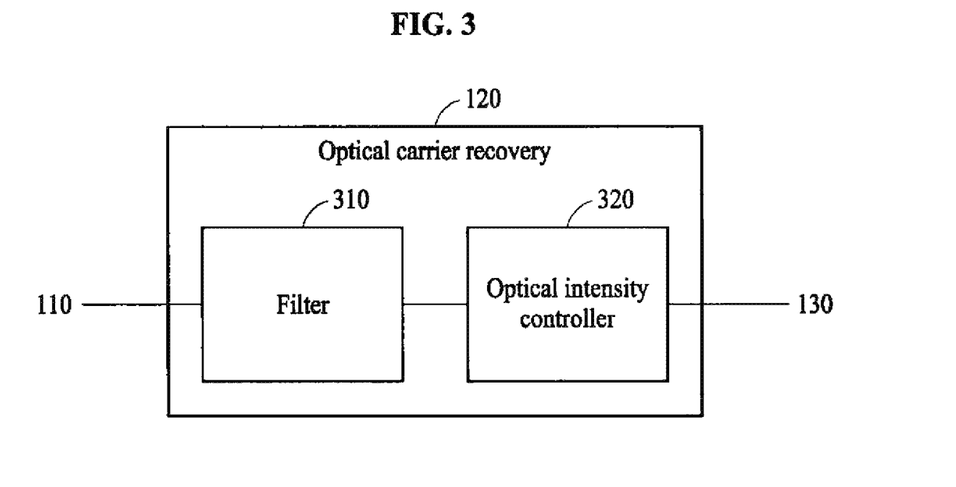
FIG. 3 is a diagram illustrating an optical carrier recovery according to an example embodiment.

FIG. 3 is a diagram illustrating an optical carrier recovery according to an example embodiment.

Referring to FIG. 3, the optical carrier recovery 120 may include a filter 310 and an optical intensity controller 320.

The filter 310 may pass an optical carrier of an analog optical signal divided for a first path and filter out a signal including information. The filter 310 may be, for example, a narrowband optical band-pass filter (NOBPF).

The optical intensity controller 320 may include an optical amplifier and an optical attenuator to increase or reduce an intensity of the optical carrier passing through the filter 310.

The optical carrier recovery 120 may include a single module in which the filter 310 and the optical intensity controller 320 are formed integrally. The optical carrier recovery 120 may be, for example, an injection-locked laser diode including the filter 310 and optical intensity controller 320.

Figure 4:
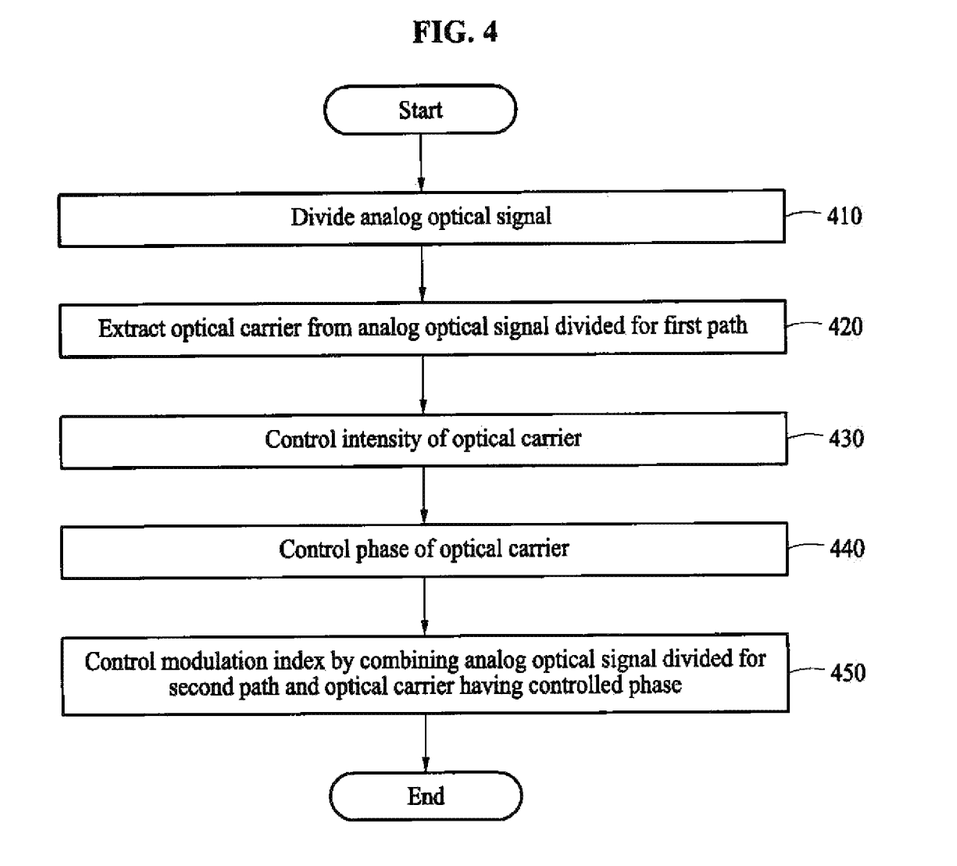
FIG. 4 is a flowchart illustrating a method of controlling a modulation index of an analog optical signal according to an example embodiment.

FIG. 4 is a flowchart illustrating a method of controlling a modulation index of an analog optical signal according to an example embodiment.

In operation 410, the divider 110 may divide an analog optical signal for a first path and a second path.

In operation 420, the optical carrier recovery 120 may extract an optical carrier from an analog optical signal divided for the first path in operation 410.

In operation 430, the optical carrier recovery 120 may control an intensity of the optical carrier extracted in operation 420. In this example, the optical carrier recovery 120 may control the intensity of the optical carrier based on a target value of the modulation index to be controlled.

In operation 440, the phase shifter 130 may control a phase of the optical carrier of which the intensity is controlled in operation 420. A process of controlling the phase of the optical carrier using the phase shifter 130 will be described with reference to FIG. 5.

In operation 450, the coupler 150 may control the modulation index of the analog optical signal by combining the analog optical signal divided for the second path in operation 410 and the optical carrier of which the phase is controlled in operation 440 so as to output the analog optical signal.

Figure 5:
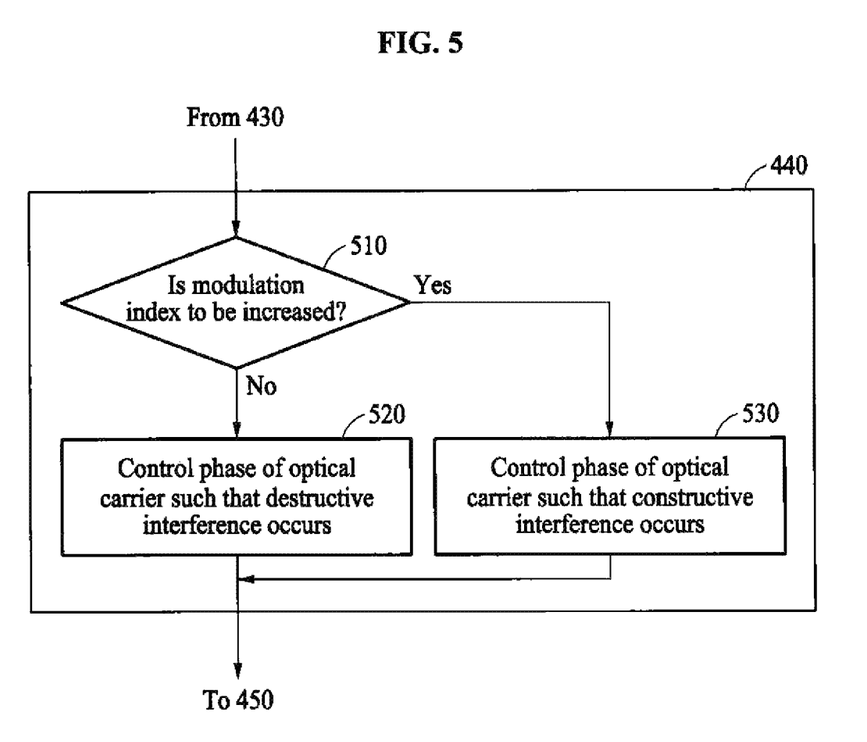
FIG. 5 is a flowchart illustrating a phase control process in a method of controlling a modulation index of an analog optical signal according to an example embodiment.

FIG. 5 is a flowchart illustrating a phase control process in a method of controlling a modulation index of an analog optical signal according to an example embodiment. Operations 510 through 530 of FIG. 5 may be included in operation 440 of FIG. 4.

In operation 510, the controller 160 may determine whether a modulation index is to be increased. In this example, the controller 160 may determine whether a modulation index is to be increased by monitoring an analog optical signal having a modulation index controlled in the coupler 150 and output from the coupler 150. When the modulation index is to be increased, the controller 160 may perform operation 530. When the modulation index is to be reduced, the controller 160 may perform operation 520.

In operation 520, the controller 160 may request the phase shifter 130 to change a phase of an optical carrier to be 180° such that a destructive interference occurs in the coupler 150. In response to the request from the controller 160, the phase shifter 130 may change the phase of an optical carrier of which an intensity is controlled in operation 420, to 180°.

In operation 530, the controller 160 may request the phase shifter 130 not to change the phase of the optical carrier such that a constructive interference occurs in the coupler 150. In response to the request from the controller 160, the phase shifter 130 may output the phase of an optical carrier of which an intensity is controlled in operation 420 without changing.

According to example embodiments, it is possible to control a modulation index of an analog optical signal by changing an intensity and a phase of an optical carrier wave extracted from the analog optical signal and combining the optical carrier wave having the changed intensity and phase with the analog optical signal.

According to example embodiments, it is possible to perform an optimized optical communication in various environments using a single type of an optical transmitter and receiver by controlling a modulation index of an optical signal based on a difference in environment between optical transmitters and receivers so as to reduce infrastructure construction and operation cost of a telecommunications carrier.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of controlling a modulation index of an analog optical signal, the method comprising:
    dividing an analog optical signal into a first analog optical signal for a first path and a second analog optical signal for a second path, the analog optical signal including an optical carrier and a signal including information;
    extracting the optical carrier from the first analog optical signal for the first path;
    controlling an intensity and a phase of the optical carrier; and
    controlling a modulation index of the analog optical signal by combining the second analog optical signal for the second path and the optical carrier having the controlled intensity and phase.

2. The method of claim 1, wherein the controlling of the intensity and the phase of the optical carrier comprises:
    controlling the intensity of the optical carrier based on a target value of the modulation index.

3. The method of claim 1, wherein in a case in which the modulation index is to be increased, the controlling of the intensity and the phase of the optical carrier comprises:
    controlling the phase of the optical carrier such that a destructive interference occurs when the modulation index is controlled.

4. The method of claim 1, wherein in a case in which the modulation index is to be decreased, the controlling of the intensity and the phase of the optical carrier comprises:
    controlling the phase of the optical carrier such that a constructive interference occurs when the modulation index is controlled.

5. The method of claim 1, further comprising:
    delaying the second analog optical signal for the second path based on a time used for extracting the optical carrier and controlling the intensity and the phase of the optical carrier,
    wherein the controlling of the modulation index comprises:
    combining the delayed second analog optical signal for the second path and the optical carrier extracted from the first analog optical signal for the first path and having the controlled intensity and phase.

6. An apparatus for controlling a modulation index of an analog optical signal, the apparatus comprising:
    a divider configured to divide an analog optical signal into a first analog optical signal for a first path and a second analog optical signal for a second path, the analog optical signal including an optical carrier and a signal including information;
    an optical carrier recovery configured to extract the optical carrier from the first analog optical signal for the first path and control an intensity of the optical carrier;
    a phase shifter configured to control a phase of the optical carrier having the controlled intensity; and
    a coupler configured to output the analog optical signal of which a modulation index is controlled, by combining the second analog optical signal for the second path and the optical carrier of which having the controlled intensity and phase.

7. The apparatus of claim 6, wherein the optical carrier recovery is configured to control the intensity of the optical carrier based on a target value of the modulation index.

8. The apparatus of claim 6, wherein in a case in which the modulation index is to be increased, the phase shifter is configured to control the phase of the optical carrier such that a destructive interference occurs in the coupler.

9. The apparatus of claim 6, wherein in a case in which the modulation index is to be decreased, the phase shifter is configured to control the phase of the optical carrier such that a constructive interference occurs in the coupler.

10. The apparatus of claim 6, further comprising:
    an optical delay line configured to delay the second analog optical signal for the second path based on a time used for passing the first analog optical signal for the first path through the optical carrier recovery and the phase shifter,
    wherein the coupler is configured to combine the delayed second analog optical signal for the second path and the optical carrier extracted from the first analog optical signal for the first path and having the controlled phase.

* * * * *